Dec. 9, 1941.  R. R. HEATH  2,265,643
ROTARY CUTTER
Filed Sept. 5, 1939  3 Sheets-Sheet 1

INVENTOR
REEDIE R. HEATH
BY
Ralph Barrow
ATTORNEY

Dec. 9, 1941.　　　R. R. HEATH　　　2,265,643
ROTARY CUTTER
Filed Sept. 5, 1939　　　3 Sheets-Sheet 3

INVENTOR
REEDIE R. HEATH
BY
Ralph Barrow
ATTORNEY

Patented Dec. 9, 1941

2,265,643

UNITED STATES PATENT OFFICE 2,265,643

ROTARY CUTTER

Reedie R. Heath, Akron, Ohio

Application September 5, 1939, Serial No. 293,373

4 Claims. (Cl. 29—78)

This invention relates to rotary cutting tools, and in particular relates to a rotary cutting tool for removing or trimming rubber tread stock from pneumatic tires, in preparation for retreading or recapping the same.

One type of tool widely used at the present time for the above purpose is known as a tackrasp, which usually comprises a rotatable body having rows of tack-like projections or pointed teeth. The tack-rasp is objectionable because it will not cut smoothly, but rather rips or tears through the rubber, leaving deep grooves and ridges on the surface of the tire. Because of the elastic or resilient nature of the rubber, continued application of the tack-rasp to the tire merely pushes the ridges aside, leaving a rough surface on the tire. This frequently permits air to be trapped under portions of the new tread layer when it is applied to the tire and these portions blister or "blow" when the retreaded or recapped tire is cured in a mold.

Another widely used type of tool comprises a cylindrical body having transversely extending knife blades in spaced relation around the periphery thereof. With this type of tool, due to the resiliency or elasticity of the tire, the knives have a tendency to chatter or vibrate, thereby forming flat spots or chatter-marks on the surface of the tire, which of course is objectionable. Other known tools of the prior art have similar objectionable features in varying degrees.

An object of this invention is to provide an improved rotary cutting tool of the character described by means of which a desired thickness of old rubber stock may be rapidly and uniformly removed from pneumatic tires, for example, to provide a substantially smooth surface around the tread portion thereof, in preparation for retreading or recapping said tires.

Another object of the invention is to provide a cutting tool of the character described, in which the cutter blades are readily adjustable outwardly of the supporting body therefor as the knives wear down from continued sharpening or use.

These and other objects of the invention will be manifest from the following brief description and the accompanying drawings.

Figure 1:
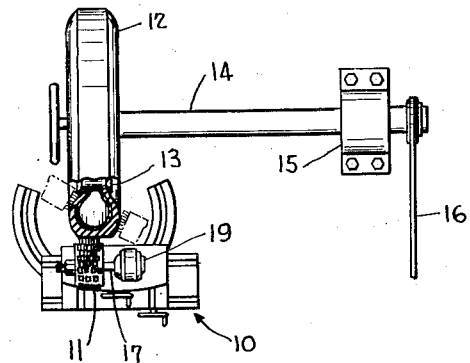
Figure 1 is a plan view of typical pneumatic tire cutting or trimming apparatus, having the improved rotary cutter embodying the invention incorporated therein.

Referring to the drawings, the numeral 10 designates a typical universally adjustable carriage for the rotary cutter, indicated generally at 11, this carriage being mounted in association with a tire 12 for trimming or cutting the old tread stock therefrom, in preparation for retreading or recapping the tire in a known manner. The tire 12, preferably assembled with a pressure tube therein on a rim 13, may be mounted on a suitable collapsible chuck (not shown), carried by a shaft 14 journalled in a support 15, the latter being driven, through a belt or chain 16, by suitable mechanism (not shown).

The rotary cutter 11 may be mounted on the shaft 17 of motor 19, mounted on the tool rest of carriage 10, motor 19 preferably being operable to drive the cutter 11 at substantially greater peripheral speed than the peripheral speed of the tire. By means of the typical tool carriage 10, the rotary cutter may be transversely adjusted to engage the tire at various positions, substantially in the manner shown in chain-dotted lines in Figure 1, and may be adjusted inwardly of the tire to vary the depth of the cut at any of said positions.

The cutter 11 comprises a cylindrical body 20 having a plurality of sockets 21 on the surface thereof, for removably, replaceably and adjustably receiving cutter blades 22. The sockets preferably are undercut at a predetermined angle to lines normal to the periphery of the body, so that the blades will incline in the same general direction about the body (see Figure 2). The blades 22 preferably are rectangular in cross-section, and are beveled at the outer ends to provide sharp edges for cutting into the tire being trimmed, rather than merely scraping over the surface thereof. The angularity of the cutter blades 22 causes the blades to be self-cleaning as the cutter is rotated in engagement with a tire to remove rubber therefrom.

The cutter blades 22 preferably are arranged in series of circumferentially spaced rows, the rows extending transversely across the cylinder. In each series of rows the adjacent blades of successive rows may be arranged in overlapping stepped relation, whereby the rubber may be rapidly shaved from a tire in substantially small particles, without leaving ridges, chatter-marks, or uneven portions on the surface of the tire, but rather providing a uniformly smooth surface around the tire.

Figure 2:
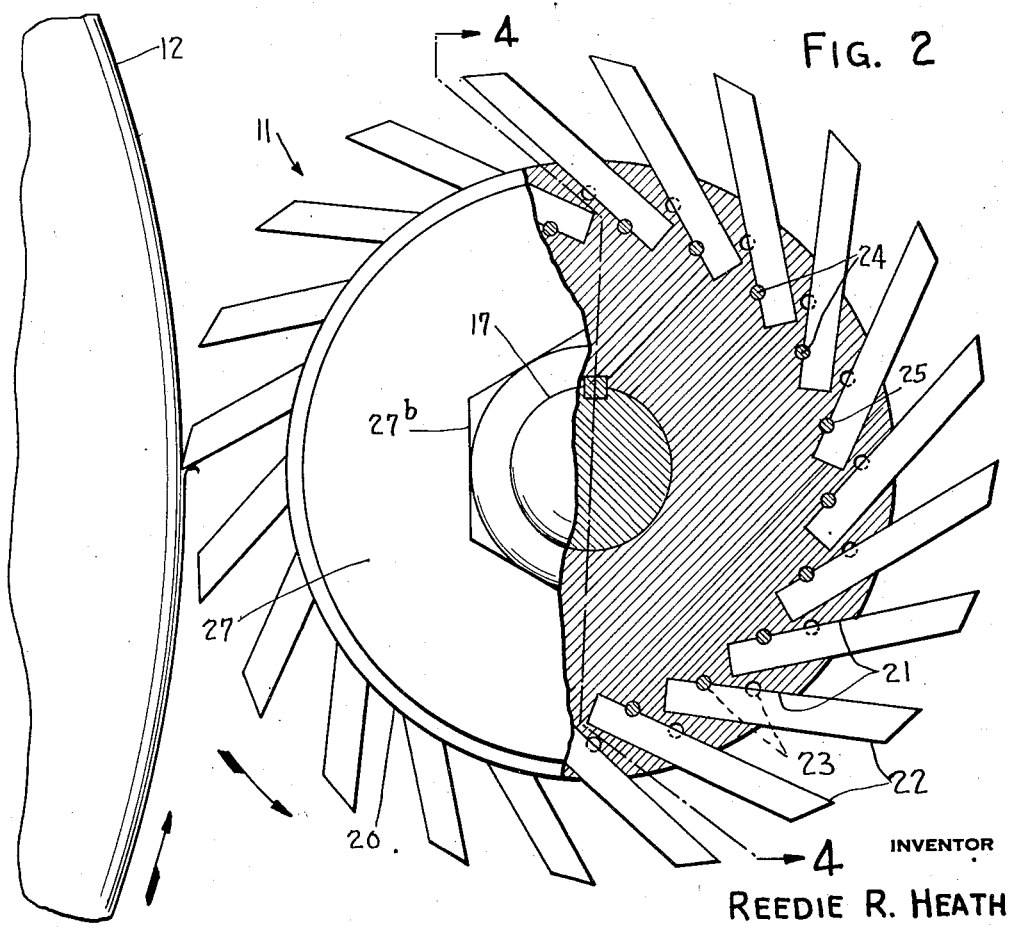
Figure 2 is an enlarged detail view, partly broken away and in section, of the rotary cutter in engagement with a tire being trimmed, as viewed from the left of Figure 1.
Figure 3:
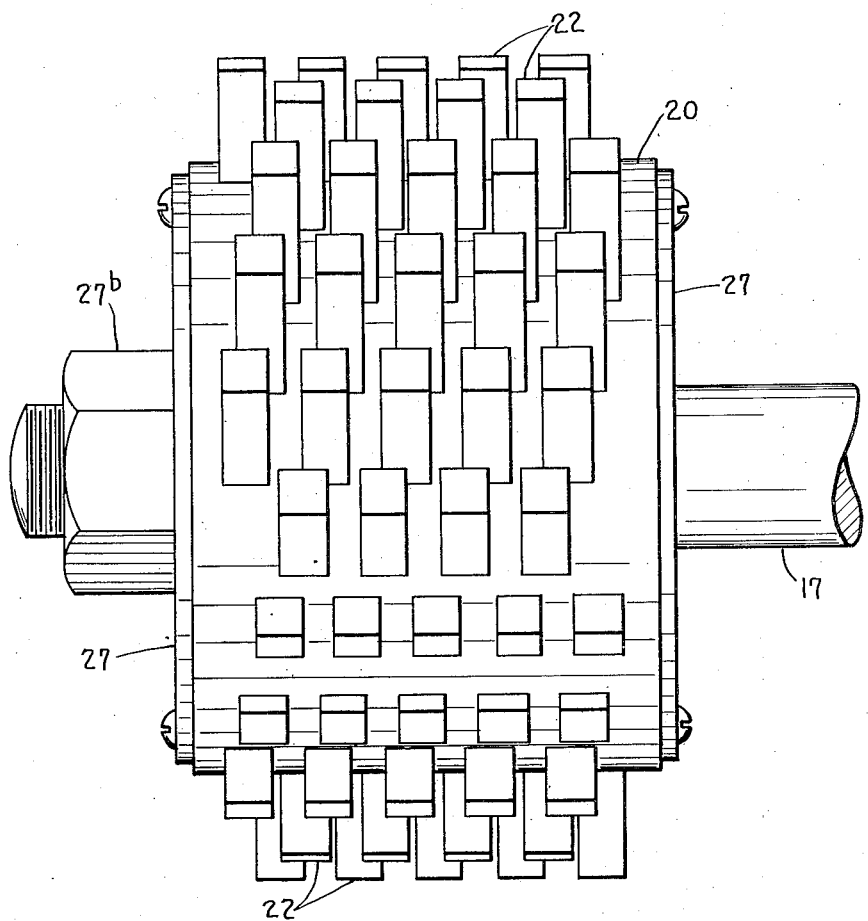
Figure 3 is an edge view of the rotary cutter, as viewed from the right of Figure 2.

For retaining the cutter blades 22 in the sockets 21, a pair of openings 23, 23 may extend through the body 20 adjacent each row of blades 22, so that a pin 24 may be received through the radially inward openings 23 to engage a slot 25 in each of the cutter blades in the respective rows thereof, as best shown in Figure 2. Caps 27, 27, removably received in bores 27ª in each end of body 20, may have flanges 29 for engaging opposite ends of pins 24 to retain the same in the respective openings therefor.

Figure 4:
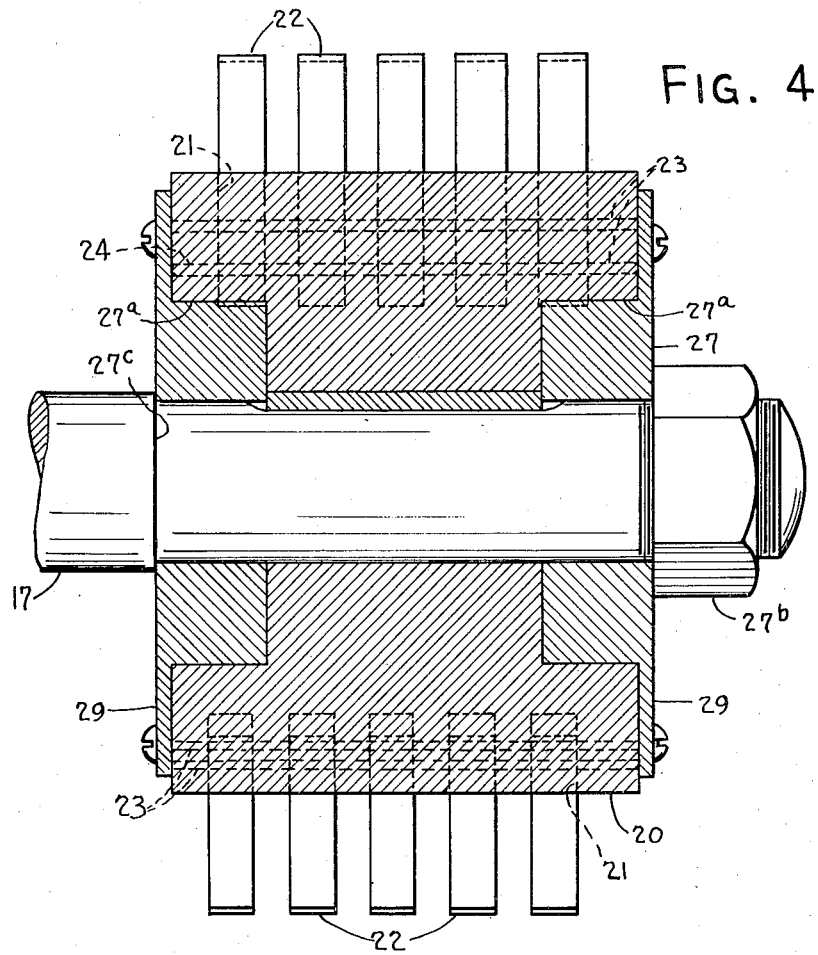
Figure 4 is a cross-section taken substantially on line 4—4 of Figure 2.
Figure 5:
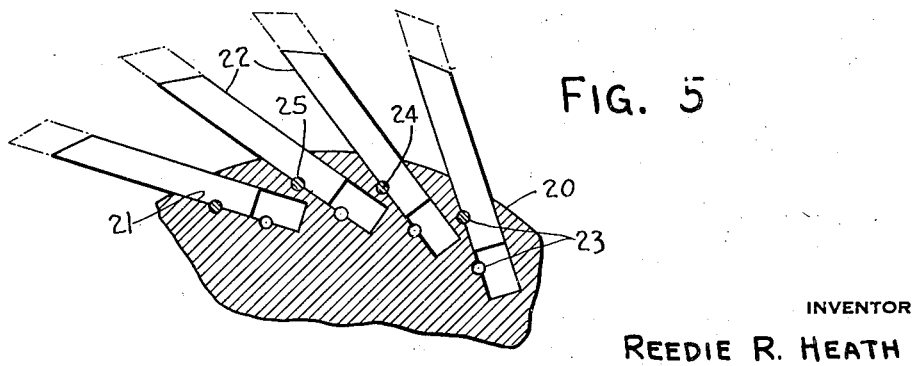
Figure 5 is a cross-section of a portion of the cutter shown in Figure 2, but illustrating the knives in the adjusted positions thereof.

The caps 27 are clamped in assembled relation with the body 20 on shaft 17 by means of a suitable nut 27b threaded on the end of the shaft, for urging the cutter assembly against a shoulder 27c on the shaft. As best shown in Figures 4 and 5, when it is required to remove or replace the blade 22, the caps 27 are first removed, permitting the pins 24 to be removed from openings 23 to release the blades retained thereby. When the blades 22 have worn down a certain amount, because of continued use and sharpening thereof, they may be adjusted radially outwardly by removing the pins 24, as described above, and reinserting the pins in the radially outward openings 23, to engage the slots 25 of the blades, in the manner illustrated in Figure 5. Obviously, a greater number of radial adjustments of the cutter blades may be obtainable by providing a correspondingly increased number of openings 23 in body 20.

In the operation of the apparatus the motor 19 is driven to rotate cutter 10, while shaft 14 preferably is driven at such speed that the peripheral speed of tire 12 is somewhat less than the peripheral speed of the cutter. The adjustments of the carriage 10 are such that the cutter may be progressively moved about a horizontal plane to trim any desired amount of rubber from tire 12. Due to the cutter blades 22 being arranged in series around the periphery of body 20, with adjacent blades in successive rows of each series in substantially overlapping stepped relation, the cutter is operable progressively to remove the rubber from the tire in substantially small portions. This provides a uniformly smooth surface, free from chatter-marks, ridges, grooves, or other irregularities. Vulcanizing a new layer of rubber on the tire to retread or recap the same, therefore, may be accomplished with a minimum of blemishes caused by air pockets formed between the tread layer and the tire carcass.

Modifications of the invention may be resorted to without departing from the spirit thereof or the scope of the appended claims.

What is claimed is:

1. A rotary cutter for cutting rubber or like elastic or resilient material, comprising a cylindrical body having circumferentially spaced straight rows of cutter blades extending coaxially of the axis of the body, said blades having straight edges for cutting axially aligned across said rows the blades of successive rows being arranged to form circumferential series in which successive blades are in substantially overlapping stepped relation, whereby the path of each blade will overlap a substantial portion of the path of the preceding blade in its circumferential series, said blades extending from said body at acute angles to tangents to the periphery of the body in the direction of rotation thereof, whereby the blades will be self-cleaning.

2. A rotary cutter of the character described, comprising a cylindrical body having therein a plurality of circumferentially spaced rows of axially spaced sockets, removable and replaceable cutter blades for fitting in said sockets, said blades having locking means thereon, said body having openings extending axially therethrough in association with each of said rows and communicating with the sockets of the respective rows, and locking elements axially insertable through an opening adjacent each row of sockets to engage the locking means on said blades to lock the same in the sockets.

3. A rotary cutter of the character described, comprising a cylindrical body having therein a plurality of circumferentially spaced rows of axially spaced sockets, removable and replaceable cutter blades for fitting in said sockets, said blades having locking means thereon, said body having openings extending axially therethrough in association with each of said rows and communicating with the sockets of the respective rows, locking elements axially insertable through an opening adjacent each row of sockets to engage the locking means on said blades to lock the same in the sockets, and members removably mounted at axially opposite ends of said body to cover the ends of said openings therein and thereby retain said elements against axial movement.

4. A rotary cutter for cutting rubber or like elastic or resilient material, comprising a substantially cylindrical body having circumferentially spaced rows of cutter blades thereon, said rows extending substantially coaxially of the axis of said body, said blades having straight cutting edges axially aligned across said rows, the blades of successive rows being arranged to form axially spaced circumferential series in which successive blades thereof are in substantially overlapping stepped relation, whereby the path of each blade will overlap a substantial portion of the path of the preceding blade in its circumferential series.

REEDIE R. HEATH.